United States Patent
Pullman

(10) Patent No.: US 12,445,027 B1
(45) Date of Patent: Oct. 14, 2025

(54) SCALABLE LOW-SPEED, HIGH TORQUE DC ELECTRIC MOTOR SYSTEM

(71) Applicant: Thomas Keith Pullman, Golden Valley, AZ (US)

(72) Inventor: Thomas Keith Pullman, Golden Valley, AZ (US)

( * ) Notice: Subject to any disclaimer, the term of this patent is extended or adjusted under 35 U.S.C. 154(b) by 0 days.

(21) Appl. No.: 19/228,747

(22) Filed: Jun. 5, 2025

Related U.S. Application Data

(60) Provisional application No. 63/709,402, filed on Oct. 18, 2024.

(51) Int. Cl.
*H02K 19/12* (2006.01)
*H02K 11/21* (2016.01)

(52) U.S. Cl.
CPC ............. *H02K 19/12* (2013.01); *H02K 11/21* (2016.01)

(58) Field of Classification Search
CPC ................................ H02K 11/21; H02K 19/12
USPC ......................................................... 310/180
See application file for complete search history.

(56) References Cited

U.S. PATENT DOCUMENTS

| | | | | |
|---|---|---|---|---|
| 5,481,147 A * | 1/1996 | Kaplan | ............... | H02K 19/103 310/156.64 |
| 5,567,999 A * | 10/1996 | Baronosky | ............. | H02K 37/04 310/194 |
| 5,739,609 A * | 4/1998 | Ueyama | ................. | H02K 7/09 310/90.5 |
| 5,864,198 A * | 1/1999 | Pinkerton | .............. | H02K 19/38 310/179 |
| 5,982,070 A * | 11/1999 | Caamano | ............... | H02K 1/185 310/43 |
| 6,121,704 A * | 9/2000 | Fukuyama | .......... | F16C 32/0489 310/90.5 |
| 7,834,495 B1 * | 11/2010 | Mitchell | ................ | H02K 11/22 310/46 |
| 8,446,060 B1 * | 5/2013 | Lugg | ...................... | F02C 3/113 310/156.22 |
| 9,293,976 B2 * | 3/2016 | Lee | ........................ | H02K 37/00 |
| 10,027,190 B2 * | 7/2018 | Kazmin | ................. | H02K 15/03 |
| 10,770,994 B2 * | 9/2020 | Poisson | ................... | H02P 25/03 |
| 2002/0125783 A1 * | 9/2002 | Morinigo | ............ | H02K 19/103 310/179 |
| 2007/0164627 A1 * | 7/2007 | Brunet | ..................... | H02K 7/09 310/90.5 |
| 2008/0088200 A1 * | 4/2008 | Ritchey | .................. | H02K 21/12 310/112 |
| 2008/0224550 A1 * | 9/2008 | Hyun | .................... | H02K 49/102 310/46 |
| 2008/0246362 A1 * | 10/2008 | Hirzel | .................... | H02K 21/12 310/156.02 |

(Continued)

*Primary Examiner* — Rashad H Johnson
(74) *Attorney, Agent, or Firm* — The Thornton Firm, LLC

(57) ABSTRACT

A scalable low-speed high torque DC electric motor system includes a rotor assembly having a rotor and one or more rotor laminations; a stator assembly having a circular housing including one or more corresponding pairs of electromagnets, one of each pair of corresponding electromagnets mounted to the upper end of the circular housing and one of each pair of corresponding electromagnets mounted to the lower end of the circular housing; a shaft assembly; a plurality of position sensors and a computer system. Multiple motor segments may connect with the shaft assembly to create an electric motor with higher performance metrics.

16 Claims, 13 Drawing Sheets

(56) References Cited

U.S. PATENT DOCUMENTS

| | | | | |
|---|---|---|---|---|
| 2012/0007451 | A1* | 1/2012 | Nelson | H02K 26/00 |
| | | | | 310/36 |
| 2017/0237326 | A1* | 8/2017 | Cicilia | H02K 21/24 |
| | | | | 310/156.36 |
| 2017/0274992 | A1* | 9/2017 | Chretien | H02K 11/33 |
| 2019/0131830 | A1* | 5/2019 | Mastrocola | H02P 29/032 |
| 2019/0350757 | A1* | 11/2019 | Charles | A61F 9/008 |
| 2021/0066984 | A1* | 3/2021 | Hunstable | H02K 3/47 |
| 2021/0211069 | A1* | 7/2021 | Reed | H02N 1/006 |
| 2021/0356040 | A1* | 11/2021 | Miyano | H02P 6/24 |
| 2025/0196612 | A1* | 6/2025 | Islam | B60K 7/0007 |

\* cited by examiner

SCALABLE LOW-SPEED, HIGH TORQUE DC ELECTRIC MOTOR SYSTEM

CROSS-REFERENCE TO RELATED APPLICATIONS

The present nonprovisional application claims priority benefit of the U.S. provisional application for patent Ser. No. 63/709,402 titled "Scalable Low Speed, High Torque Electric Motor" filed on Oct. 18, 2024 under 35 U.S.C. § 119 (e). The contents of this related nonprovisional application are incorporated herein by reference for all purposes to the extent that such subject matter is not inconsistent herewith or limiting hereof.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

BACKGROUND OF THE INVENTION

1. Field of the Invention

The invention relates generally to electric motors. More specifically, the invention relates to a scalable low-speed high torque DC electric motor system capable of performing multiple functions.

2. Description of the Related Art

Electric motors are well known in the art. An electric motor is a machine that converts electrical energy into mechanical energy. In general, electric motors operate through interactions between a magnetic field and an electric current in a wire winding to generate a force in the form of torque applied on a motor's shaft. Electric motors can be powered by direct current (DC) sources, such as from a battery, a battery pack or solar energy, or by alternating current (AC) sources, such as a power grid or an electric generator.

Over the years, numerous attempts have been made to improve performance of electric motors. Presently, there exists a need for an improved high-torque, low RPM direct current electric motor.

SUMMARY

The present invention fulfils the long-felt need for an improved scalable low-speed high torque DC electric motor system. At its essence, the invention includes one or more motor segments, each motor segment comprising a rotor assembly having a rotor and one or more rotor laminations; a stator assembly having a circular housing having one or more corresponding pairs of electromagnets, one of each pair of corresponding electromagnets mounted to the upper end of the said circular housing and one of each pair of corresponding electromagnets mounted to the lower end of the said circular housing; a shaft assembly; one or more position sensors; and a computer system.

In embodiments of the invention, the rotor laminations are spaced apart at regular intervals on center. In some embodiments, the rotor laminations are of the exact size and shape. In some embodiments, the rotor laminations are of the same general size and shape. In some embodiments, the size and shape of the rotor laminations may vary depending on the size and shape of the stationary electromagnets. Likewise, the stationary electromagnets mounted to the upper end of the circular housing are spaced apart at regular intervals on center and the stationary electromagnets mounted to the lower end of the circular housing are spaced apart at regular intervals. In some embodiments, the stationary electromagnets are of the exact size and shape. In other embodiments, the stationary electromagnets are of the same general size and shape. In some embodiments, the size and shape of the stationary electromagnets may vary depending on the size and shape of the rotor laminations.

In a preferred embodiment of the invention, the scalable low-speed high torque DC electric motor system is approximately 9 feet in diameter. The motor is powered by direct current. Embodiments of the invention can be powered by solar power or by a bank of batteries charged and recharged by solar power. The invention does not utilize permanent magnets and does not provide power to the rotor or rotor laminations. The invention does not reverse the direction of current flow in any circuit, nor does the invention reverse polarity of any of the electromagnets used.

In one exemplary embodiment of the invention, a scalable low-speed high torque DC electric motor system includes one or more motor segments, each motor segment comprising a rotor assembly comprising a rotor and thirty rotor laminations spaced apart at twelve-degree increments on center; a stator assembly comprising a circular housing having twelve corresponding pairs of electromagnets with twelve electromagnets mounted to the upper end of the said circular housing and twelve corresponding electromagnets mounted to the lower end of the said circular housing; and a shaft assembly. The invention further includes a computer system including at least one processor and memory having computer readable instructions which, when instructed by the said at least one processor, cause the scalable low-speed high torque DC electric motor system to energize each corresponding pair of electromagnets to rotate the rotor assembly at least one degree; receive a signal from one or more position sensors after the rotor assembly has rotated a certain angular distance; and energize the next corresponding pair of electromagnets to rotate the rotor assembly at least one degree until a desired rotational speed or torque has been achieved.

The scalable low-speed high torque DC electric motor system, subject to physical limitations, can be fitted with a shaft assembly that accommodates one, two, three, four, or any number of motor segments. The distance between each motor segment being sufficient to prevent magnetic interaction between motor segments.

An object of the invention is to provide reliable electromechanical power for homes, businesses and industry that are on or off an existing power grid. Such an improved high torque, low RPM electric motor is capable of providing such power. The scalable low-speed, high torque DC electric motor system can be utilized to drive one or a plurality of identical machines or a plurality of different machines, including but not limited to winches, pumps, compressors, conveyers, drill presses, circular saws, jig saws, lifts, grinding mills, DC generators, AC generators.

An additional object of the invention is to provide electromechanical power utilizing DC power produced by solar power systems without the need for inverters. Such systems can be implemented quickly and without the need of traditional infrastructure. The scalable low-speed, high torque DC electric motor system, powered by direct current produced by solar power, can be utilized worldwide as a stationary or portable system of electromechanical power for real property, homes, businesses, industry, and governments. The scalable low-speed, high torque DC electric motor system, powered by direct current produced by solar power, can be utilized worldwide as a stationary or portable system of electromechanical power to drive AC and DC generators.

An alternative object of the invention is to provide a small, efficient power plant. A small power plant utilizing one or a plurality of scalable low-speed, high torque DC electric motor systems can be owned and utilized onsite by landowners, homeowners or business owners in grouped proximity in an area that lacks access to a power grid. A small power plant utilizing one or a plurality of scalable low-speed, high torque DC electric motor systems can be utilized by a business to produce and sell electrical power to landowners, homeowners, business owners and government entities in grouped proximity in an area that lacks access to a power grid. A scalable low-speed, high torque DC electric motor system coupled with a portable solar panel array can be utilized in place of an internal combustion engine to drive an AC generator in work areas that lack access to a power grid.

Another object of the invention is to drive an AC generator as a means of offsetting the cost of electric power sold by a utility company and to provide AC power during power outages. The scalable low-speed, high torque DC electric motor system can be utilized onsite by a landowner, homeowner, business owner or government entity to drive an AC generator in an area that lacks access to a power grid. A small power plant utilizing one or a plurality of scalable low-speed, high torque DC electric motor systems can be owned and utilized onsite by landowners, homeowners or business owners in grouped proximity to offset the cost of electric power sold by a utility company, and to offset a power outage.

A further object of the invention is to provide a scalable DC electric motor system which can include more than one motor segment. Subject to physical limitations, the scalable low speed high torque DC electric motor can be configured with one, two, three, four, or more, of its uniquely designed motor segments, specifically designed to operate as a single motor segment, or in synchronization as a plurality of identical motor segments.

BRIEF DESCRIPTION OF THE DRAWINGS

The invention directed by way of example, and not by way of limitation, in the figures of the accompanying drawings and in which like reference numerals refer to similar elements and in which.

Figure 1:
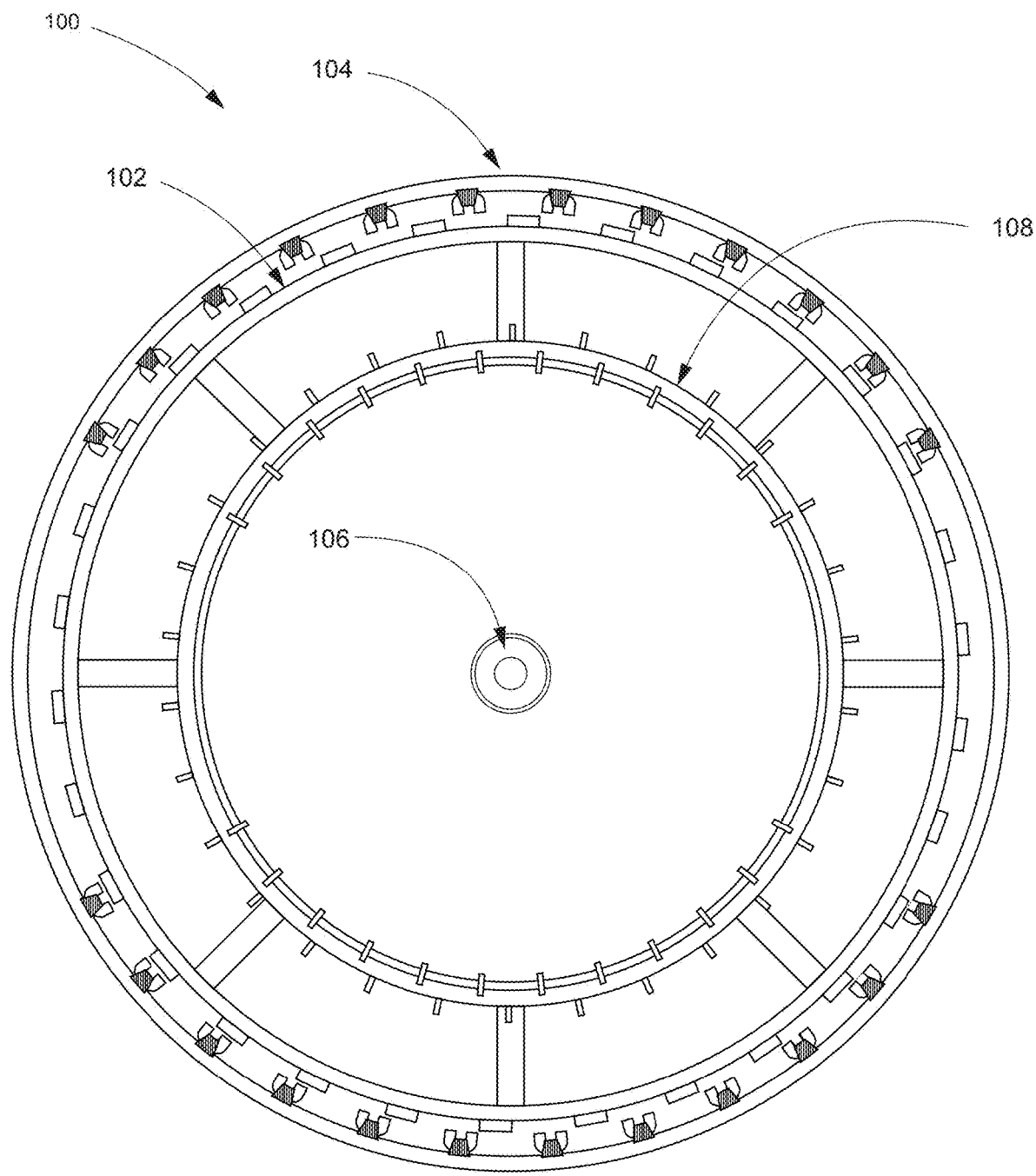
FIG. 1 illustrates a front view of a motor segment of a scalable low-speed high torque DC electric motor system in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

As is well known to those skilled in the art, many careful considerations and compromises typically must be made when designing the optimal manufacture or commercial implementation of such a scalable low-speed high torque DC electric motor system A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

The exemplary scalable low-speed high torque DC electric motor system will now be described in detail with reference to embodiments thereof as illustrated in the accompanying drawings.

FIG. 1 is a front view of a motor segment 100 of a scalable low-speed high torque DC electric motor system in accordance with an embodiment of the invention. The invention comprises one or more motor segments, each motor segment 100 comprising a rotor assembly 102 comprising a rotor and a plurality of rotor laminations; a stator assembly 104 having a circular housing having a plurality of corresponding pairs of electromagnets, one of each pair of corresponding electromagnets mounted to the upper end of the said circular housing and one of each pair of corresponding electromagnets mounted to the lower end of the said circular housing; a shaft assembly 106; and a position sensor system 108. The invention further includes a computer system including at least one processor and memory having computer readable instructions which, when instructed by the said at least one processor, cause the scalable low-speed high torque DC electric motor system to energize each corresponding pair of electromagnets to rotate the rotor assembly at least one degree; receive a signal from one or more position sensors after the rotor assembly has rotated a certain angular distance; and energize the next corresponding pair of electromagnets to rotate the rotor assembly at least one degree until a desired rotational speed has been achieved.

It will be readily apparent to persons having skill in the art that a tower, frame, or other mounting system is used to attach each motor segment by way of the shaft assembly 106 to the said tower, frame, or other mounting system. The scalable low-speed high torque DC electric motor system can be a permanent fixture or other embodiments of the invention can be assembled, disassembled, and moved from one location to another.

Figure 2:
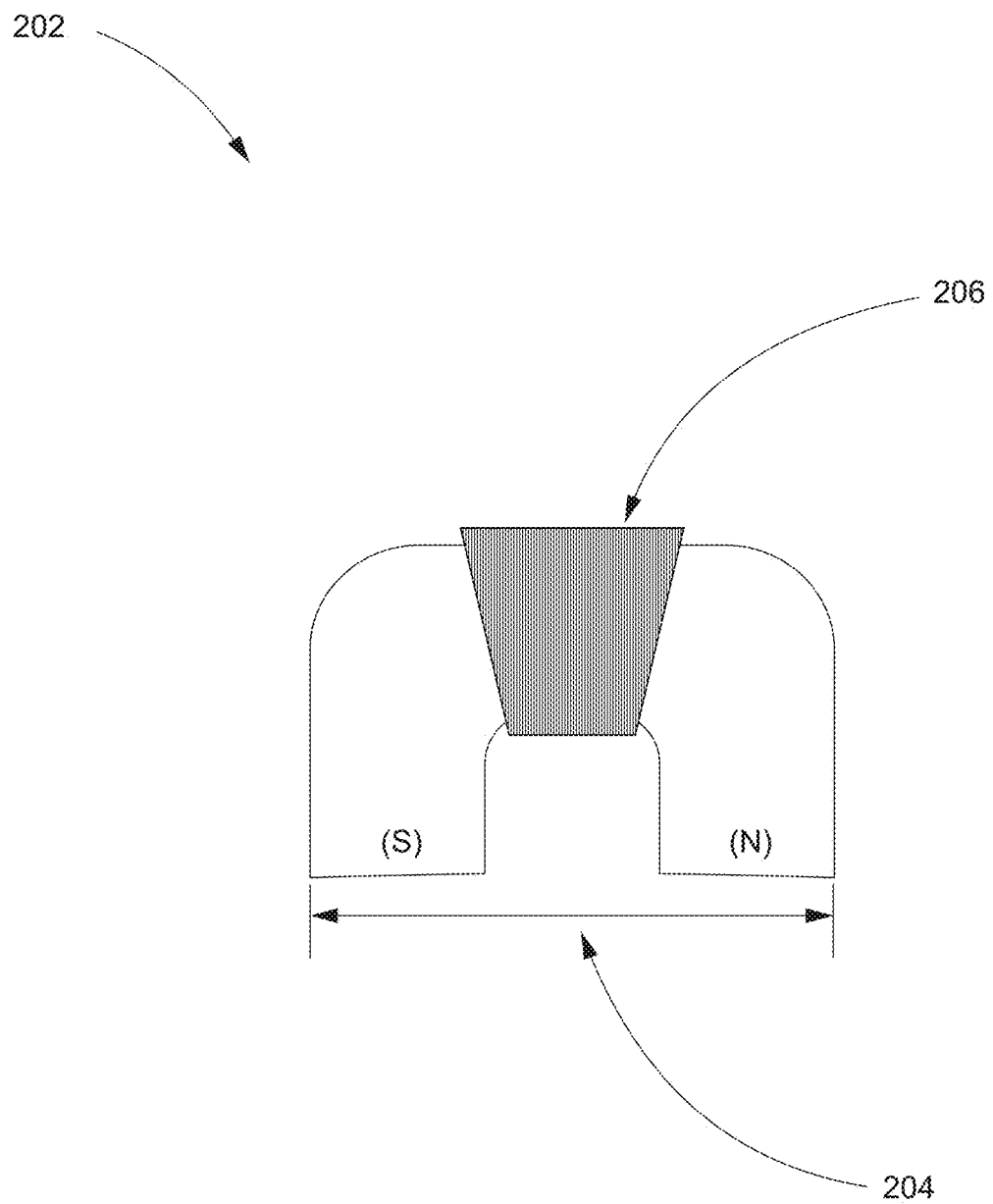
FIG. 2 illustrates a front view of a stationary electromagnet used in a scalable low-speed high torque DC electric motor system in accordance with an embodiment of the invention.

FIG. 2 is a front view of a stationary electromagnet 202 used in a scalable low speed high torque electric motor in accordance with an embodiment of the invention. In a preferred embodiment of the invention, the pole face 204 of a stationary electromagnet 202 consists of both a north pole and a south pole of the stationary electromagnet, marked (N) and (S). In one embodiment of the invention, the pole face 204 of each stationary electromagnet 202 encompasses 4 rotational degrees. The arc length of the pole face 204 of a stationary electromagnet 202 is 3.6 inches. Each of the 4 rotational degrees encompassed within the pole face of a stationary electromagnet 202, when divided equally by 4, produces 16 one-quarter degree divisions within the 4-degree arc. Each rotational degree can be defined as an 'Angle (deg).'

In one embodiment of the invention, each stationary electromagnet 202 includes 420 turns of 15.5 AWG heavy-build copper magnet wire 206. Each stationary electromagnet 202, when energized, "pulls" its respective rotor lamination 1 degree counterclockwise. For purposes of the present patent application, a stationary electromagnet is to be broadly interpreted to include any combination of materials which can be used to comprise stationary electromagnets.

Figure 3:
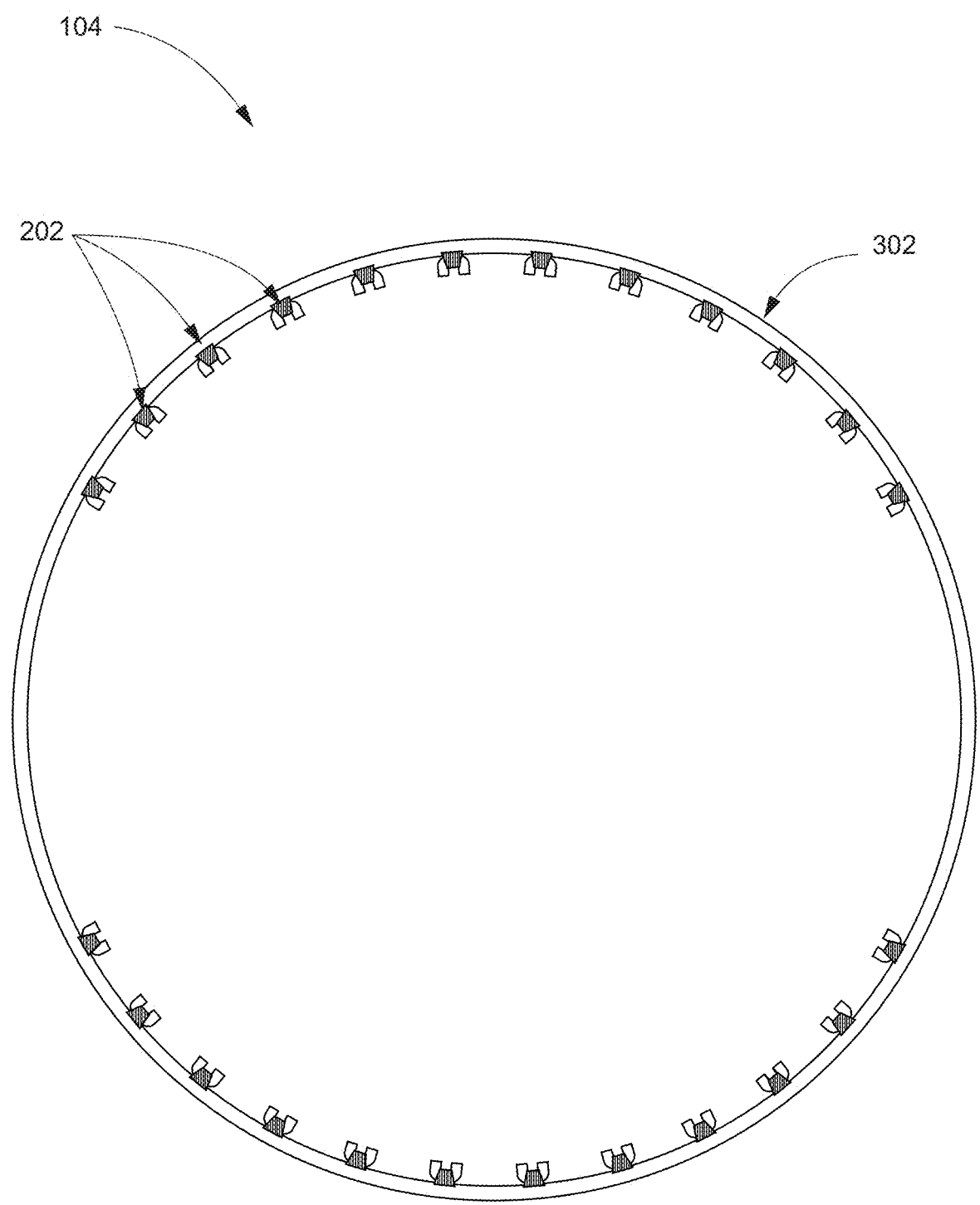
FIG. 3 illustrates a front view of a stator assembly used in a scalable low-speed high torque DC electric motor system in accordance with an embodiment of the invention.

FIG. 3 is a front view of a stator assembly 104 used in a scalable low speed high torque DC electric motor in accordance with an embodiment of the invention. In embodiments of the invention, a stator assembly having a circular housing 302 having one or more corresponding pairs of stationary electromagnets 202, one of each pair of corresponding electromagnets 202 mounted to the upper end of the said circular housing and one of each pair of corresponding electromagnets mounted to the lower end of the said circular housing. In embodiments of the invention, the one or more corresponding pairs of electromagnets mounted to the upper end of the circular housing are of the same general size and shape, and are spaced apart at regular intervals on center; and the one or more corresponding pairs of electromagnets mounted to the lower end of the circular housing are of the same general size and shape, and are spaced apart at regular intervals on center.

In one embodiment of the invention, the stator assembly 104 consists of 12 custom designed stationary electromagnets 202 positioned at the top of the circular housing 302 and 12 of the same custom designed stationary electromagnets 202 positioned at the bottom of the circular housing 302. In one embodiment of the invention, the electromagnets are of the same general size and shape in relation to one another. The 12 stationary electromagnets positioned at the top of the circular housing 302 are fixed in position by the use of adjustable, aluminum mounting brackets attached to a tower, frame, or other mounting system secured to the level mounting surface. The top of the tower, frame, or other mounting system is arced to mimic the section of the rotor where the stationary electromagnets 202 are to be positioned. The 12 stationary electromagnets positioned at the bottom of the circular housing 302 are fixed in position by the use of adjustable, aluminum mounting brackets attached to a short aluminum tower secured to the level mounting surface. The bottom of the tower, frame, or other mounting system is arced to mimic the section of the rotor where the electromagnets 202 are to be positioned.

Figure 4:
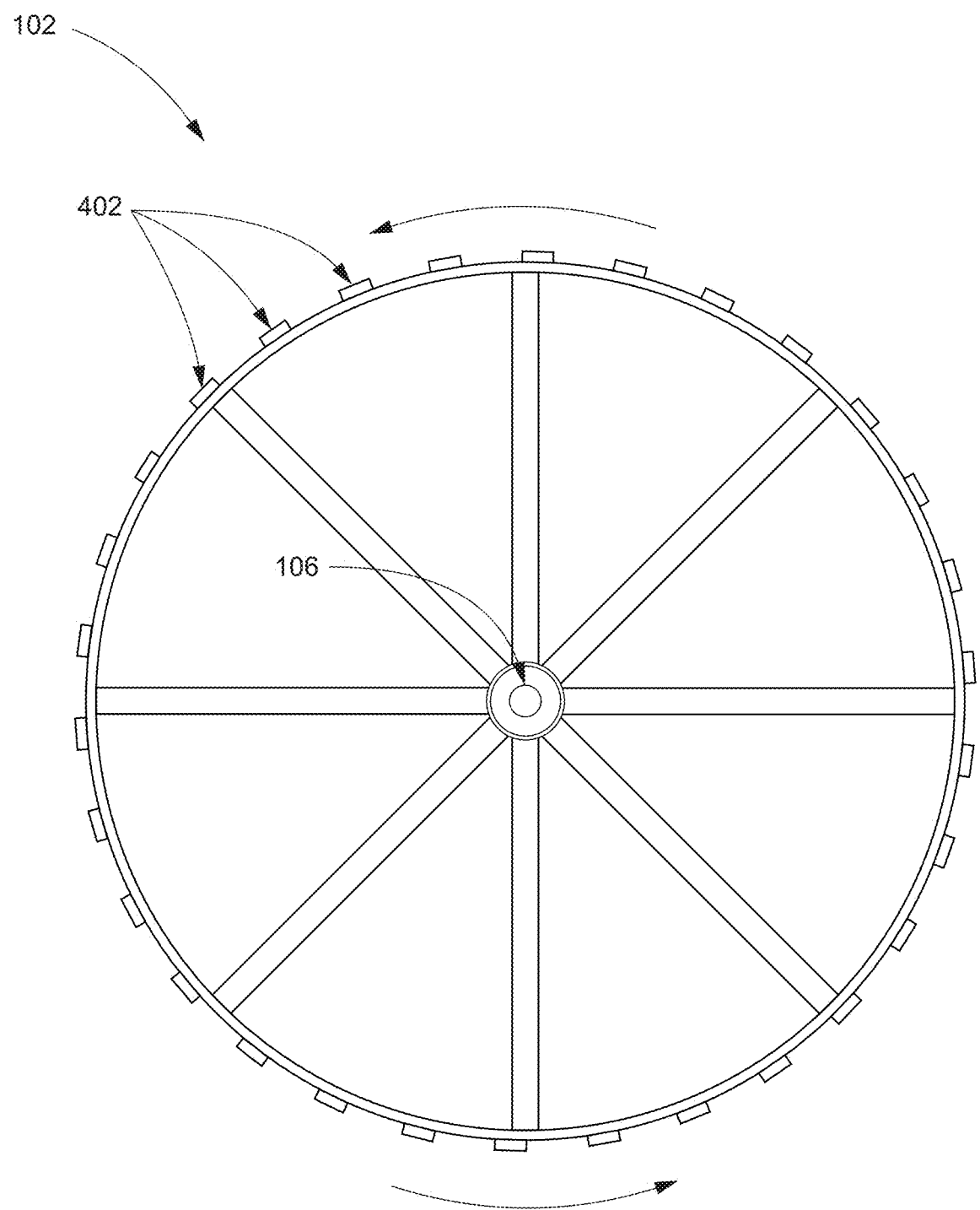
FIG. 4 illustrates a front view of a rotor assembly used in a scalable low-speed high torque DC electric motor system in accordance with an embodiment of the invention.

FIG. 4 is a front view of a rotor assembly 102 used in a scalable low speed high torque electric motor in accordance with an embodiment of the invention. In some embodiments of the invention, one or more rotor laminations are used to create a rotor assembly. In a preferred embodiment of the invention, a rotor assembly is comprised of a rotor wheel comprised of 30 electrical steel laminations 402 uniformly spaced from one another. The uniform spacing of the thirty rotor laminations at twelve-degree increments on center produces an absolute spacing of eight rotational degrees between the edges of each rotor lamination, with each rotor lamination having an arc length of four rotational degrees. The uniform spacing of eight rotational degrees between the edges of each rotor lamination causes a) the magnetic attraction, between a stationary electromagnet and the two rotor laminations that are closest to the rotor lamination that is the intended object of magnetic attraction by the stationary electromagnet, to be reduced to near zero; and b) the magnetic force of attraction, between a stationary magnet and the rotor lamination that is the intended object of magnetic attraction by the stationary electromagnet, to be maximized.

For purposes of the present patent application, a lamination is to be broadly interpreted to include any combination of materials which can be used to comprise rotor laminations including, but not limited to, steel or a ferromagnetic material. Each lamination can be referred to as a "rotor lamination." The rotor wheel includes a shaft assembly 106 which serves the axis of rotation of the rotor assembly. The end of an extended length of a shaft assembly 106, if necessary, is supported by a roller bearing affixed to the outer and/or inner side of a mounting tower. The shaft assembly 106, to effectively drive one or a plurality of machines, is constructed to accommodate attachment of one or a plurality of different sized gears to the shaft assembly 106. As the rotor turns counterclockwise, the rotor laminations 402 interact with each stationary electromagnet 202 positioned at the top of the stator, and to each stationary electromagnet positioned at the bottom of the stator.

Figure 5A:
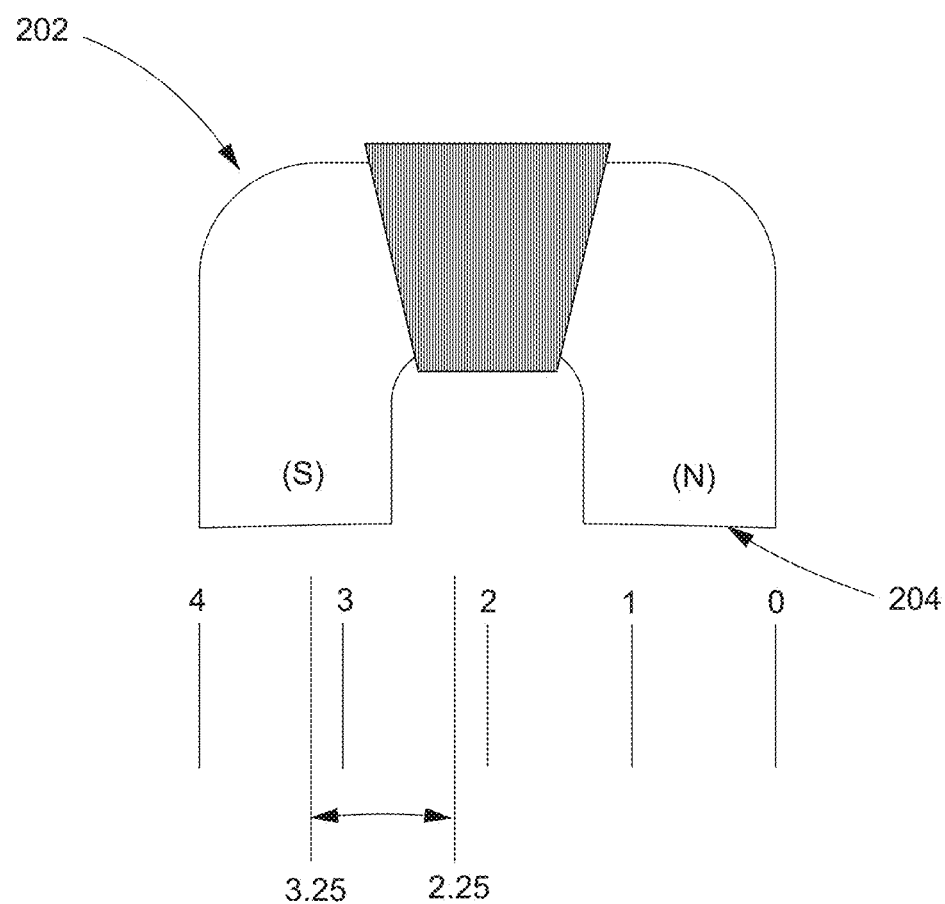
FIG. 5A illustrates a front view of a stationary electromagnet used in a scalable low-speed high torque DC electric motor system in accordance with an embodiment of the invention.

FIG. 5A illustrates a front view of a stationary electromagnet 202 used in a scalable low-speed high torque DC electric motor system in accordance with an embodiment of the invention. In a preferred embodiment of the invention, the pole face 204 of a stationary electromagnet 202 encompasses 4 rotational degrees as illustrated. Each of the 4 rotational degrees encompassed within the pole face 204 of a stationary electromagnet 202 can be defined as an Angle (deg). Each stationary electromagnet works in tandem with a corresponding electromagnet to form a synchronized pair of stationary electromagnets. Each stationary electromagnet 202 within a synchronized pair is energized when the leading edges of the pair's corresponding rotor laminations are positioned at Angle (deg) 2.25. Each stationary electromagnet 202 within a synchronized pair is deenergized when the leading edges of the pair's corresponding rotor laminations are positioned at Angle (deg) 3.25. The force of magnetic attraction between a stationary electromagnet and its corresponding rotor lamination is the greatest as the leading edge of the rotor lamination travels 1-degree counterclockwise from Angle (deg) 2.25 to Angle (deg) 3.25.

Figure 5B:
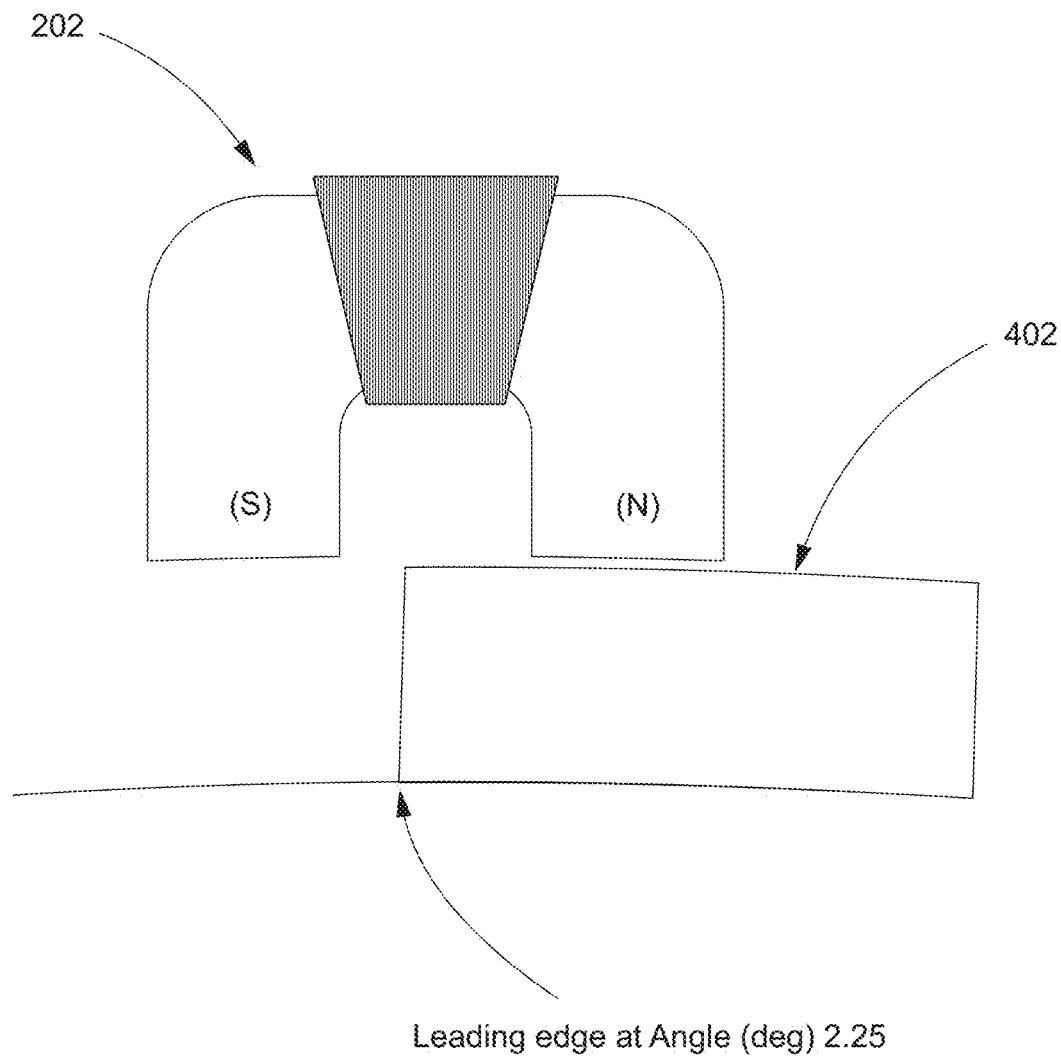
FIG. 5B illustrates a front view of a stationary electromagnet and rotor lamination used in a scalable low-speed high torque DC electric motor system in accordance with an embodiment of the invention.

FIG. 5B is a front view of a stationary electromagnet 202 and a rotor lamination 402 of a scalable low speed high torque direct current electric motor in accordance with an embodiment of the invention. The outer pole face of a rotor lamination 402 encompasses 4 rotational degrees. The arc length of the outer pole face of a rotor lamination is 3.6 inches. The length of a rotor lamination is 4 inches. The pole face of a stationary electromagnet 202 encompasses 4 rotational degrees. The arc length of the pole face of a stationary electromagnet 202 is 3.6 inches. The length of a stationary electromagnet 202 is 4 inches. The stationary electromagnets 202 within a pair of stationary electromagnets are simultaneously energized when the leading edges of the corresponding rotor laminations are simultaneously positioned at Angle (deg) 2.25. Each stationary electromagnet within a pair of stationary electromagnets, when the pair is simultaneously energized, "pulls" its respective rotor lamination 1 degree counterclockwise, from Angle (deg) 2.25 to Angle (deg) 3.25, in synchronization with the stationary electromagnet to which it is paired.

Figure 5C:
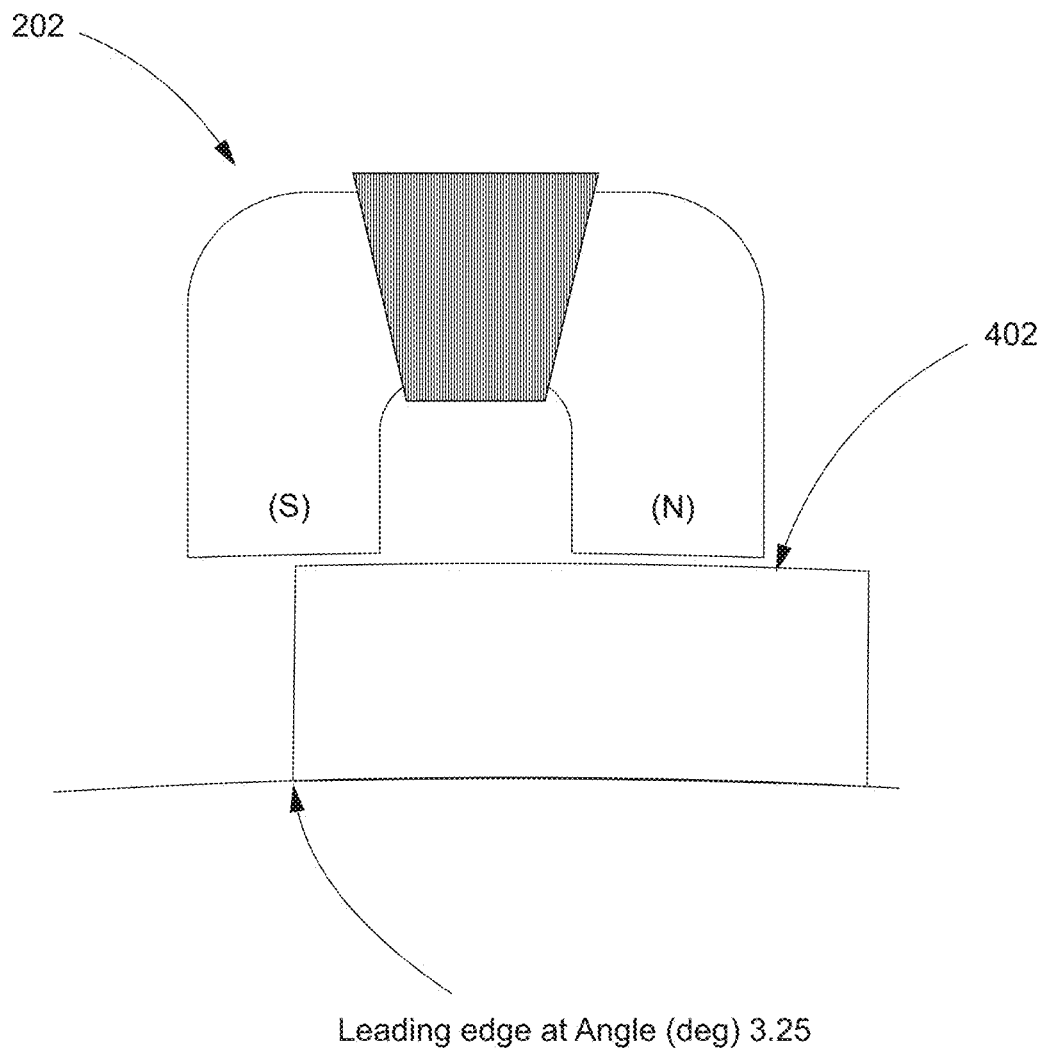
FIG. 5C illustrates a front view of a stationary electromagnet and rotor lamination used in a scalable low-speed high torque DC electric motor system in accordance with an embodiment of the invention.

FIG. 5C is a front view of a stationary electromagnet 202 and a rotor lamination 402 of a scalable low speed high torque direct current electric motor in accordance with an embodiment of the invention. The outer pole face of a rotor lamination 402 encompasses 4 rotational degrees. The arc length of the outer pole face of a rotor lamination is 3.6 inches. The length of a rotor lamination is 4 inches. The pole face of a stationary electromagnet 202 encompasses 4 rotational degrees. The arc length of the pole face of a stationary electromagnet 202 is 3.6 inches. The length of a stationary electromagnet 202 is 4 inches. Each stationary electromagnet within a pair of stationary electromagnets, when the pair is simultaneously energized, "pulls" its respective rotor lamination 402 1 degree counterclockwise, from Angle (deg) 2.25 to Angle (deg) 3.25, in synchronization with the stationary electromagnet 202 to which it is paired. The stationary electromagnets within a pair of stationary electromagnets are simultaneously deenergized when the leading edges of the corresponding rotor laminations are simultaneously positioned at Angle (deg) 3.25.

Figure 5D:
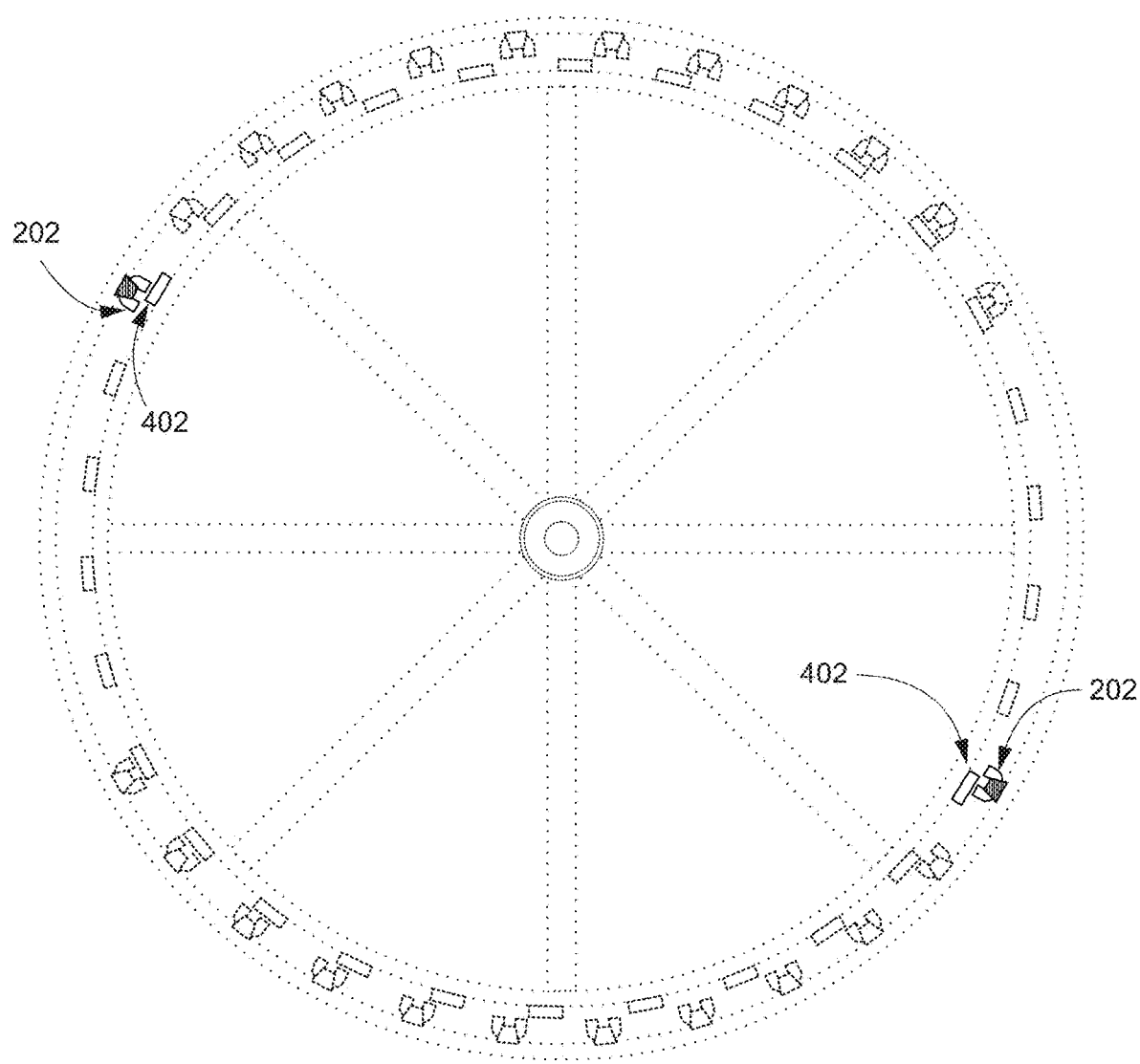
FIG. 5D illustrates a front view of a pair of stationary electromagnets and a corresponding pair of rotor laminations used in a scalable low-speed high torque DC electric motor system in accordance with an embodiment of the invention.

FIG. 5D illustrates a front view of a pair of stationary electromagnets 202 and corresponding rotor laminations 402 used in a scalable low-speed high torque DC electric motor system in accordance with an embodiment of the invention. Each stationary electromagnet within a pair is positioned 180 degrees opposite its paired counterpart. The pair of stationary electromagnets is energized when the leading edges of the corresponding rotor laminations are positioned at Angle (deg) 2.25. The pair of stationary electromagnets is deenergized when the leading edges of the corresponding rotor laminations are positioned at Angle (deg) 3.25. This 1-degree counterclockwise rotation aligns the leading edges of the next pair of rotor laminations at Angle (deg) 2.25 of the next corresponding pair of stationary electromagnets 202. The delivery of current flow to each corresponding pair of stationary electromagnets from Angle (deg) 2.25 through Angle (deg) 3.25 is controlled through the use of a computer system.

Figure 6:
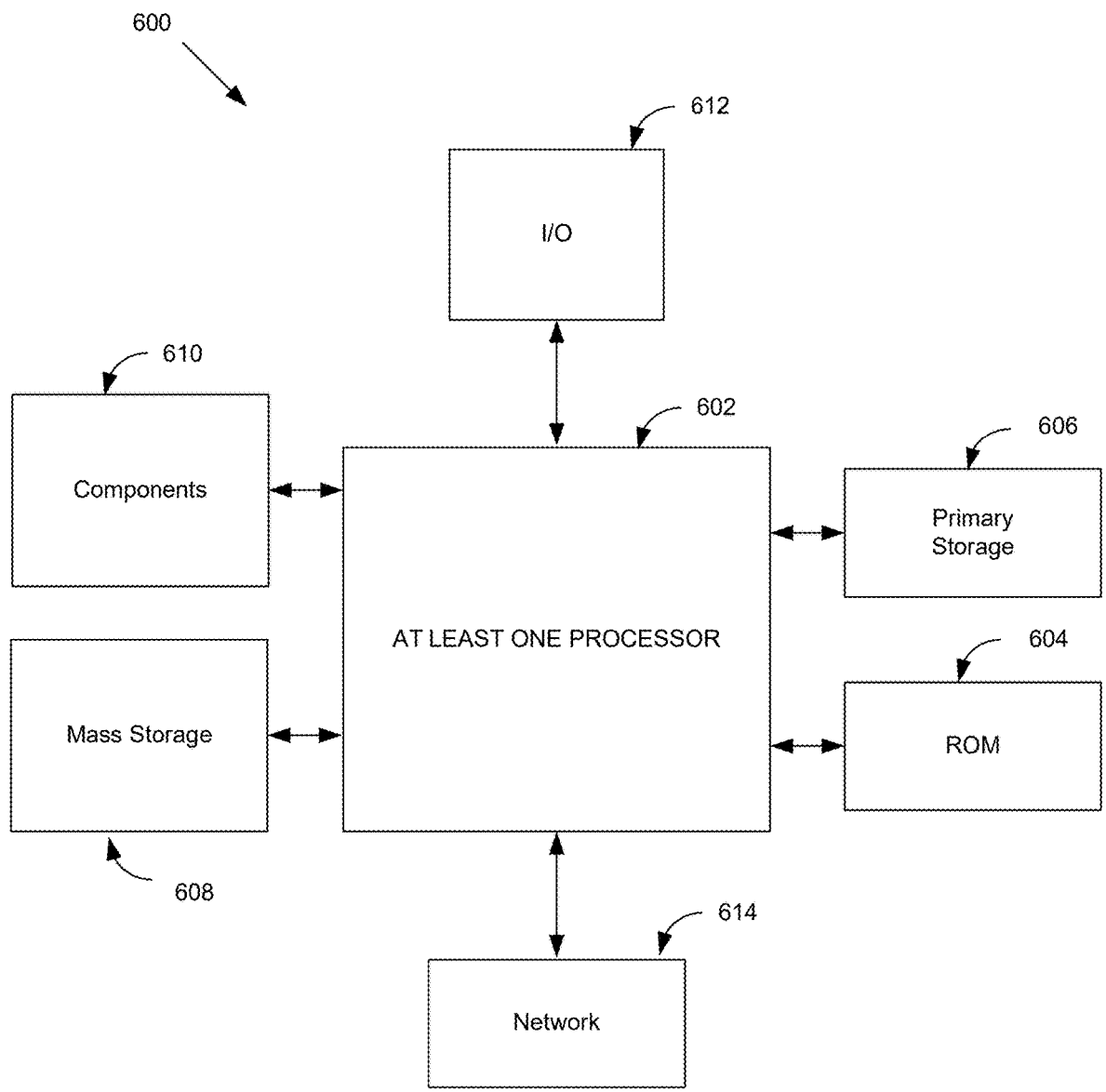
FIG. 6 illustrates a block diagram of a computer system that, when appropriately configured or designed, may serve as a computer system for which the a scalable low-speed high torque DC electric motor system, and the components thereof, may be embodied.

FIG. 6 illustrates a block diagram of a computer system that, when appropriately configured or designed, may serve as a computer system for which the scalable low speed high torque DC electric motor, and the components thereof, may be embodied. The computer system 600 includes at least one processor 602 (also referred to as central processing units, or CPUs) that may be coupled to storage devices including a primary storage 606 (typically a random-access memory, or RAM), a primary storage 604 (typically a read-only memory, or ROM). CPU 602 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors. As is well known in the art, primary storage 604 acts to transfer data and instructions uni-directionally to the CPU and primary storage 606 typically may be used to transfer data and instructions in a bi-directional manner. The primary storage devices discussed previously may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and typically may be used as a secondary storage medium such as a hard disk. It will be appreciated that the information retained within mass storage device 608, may, in appropriate cases, be incorporated in standard fashion as part of primary storage 606 as virtual memory. One or more components 610 such as, but not limited to, position sensors, motion sensors, voltmeters, ammeters, etc., can be coupled with the at least one processor so as to provide greater efficiency. A specific mass storage device such as a CD-ROM or flash memory 614 may also pass data uni-directionally to the CPU. In such an embodiment, the computer system 600 can reside in a scalable low-speed high torque DC electric motor system, the instructions for operating each machine being stored as memory in primary storage 604, 606 or mass storage 608. In the preferred embodiment of the invention, a microcontroller system such as, but not limited to, the Raspberry Pi® 3 Model B+ is used. However, other suitable microprocessor and/or microcontroller units can be employed.

The CPU 602 may also be coupled to an interface 612 that connects to one or more input/output devices such as track balls, mice, keyboards, microphones, touch-sensitive displays, transducer card readers, magnetic or paper tape readers, tablets, styluses, voice or handwriting recognizers, or other well-known input devices such as, of course, other computers. In the preferred embodiment, the CPU is coupled with a touchscreen monitor. By way of example, and not limitation, a smartphone application or tablet application can be readily implemented to control the motor speed. Finally, CPU 602 optionally may be coupled to an external device such as a database or a computer or telecommunications or internet network using an external connection shown generally as a network 614, which may be implemented as a hardwired or wireless communications link using suitable conventional technologies. With such a connection, the CPU might receive information from the network, or might output information to the network in the course of performing the method steps described in the teachings of the present invention.

It will be understood by persons having skill in the art that memory storing computer readable instructions that, when executed by the at least one processor, cause the scalable low speed high torque DC electric motor by at least one processor to execute the steps of energizing each corresponding pair of electromagnets to rotate the rotor assembly; receive a signal from the one or more position sensors after the rotor assembly has rotated a certain angular distance; and energize the next corresponding pair of electromagnets to rotate the rotor assembly until a desired rotational speed has been achieved. It will become readily apparent to persons having skill in the art that the voltage requirement at a specific RPM is dependent upon the electrical resistance produced within the coil of each stationary electromagnet at the respective RPM. A change in voltage at a specific RPM will affect a change in current that will affect a change in the constant dynamic torque and the resulting RPM. Through the use of a position sensor system, metrics such as RPM can be accurately measured.

Figure 7A:
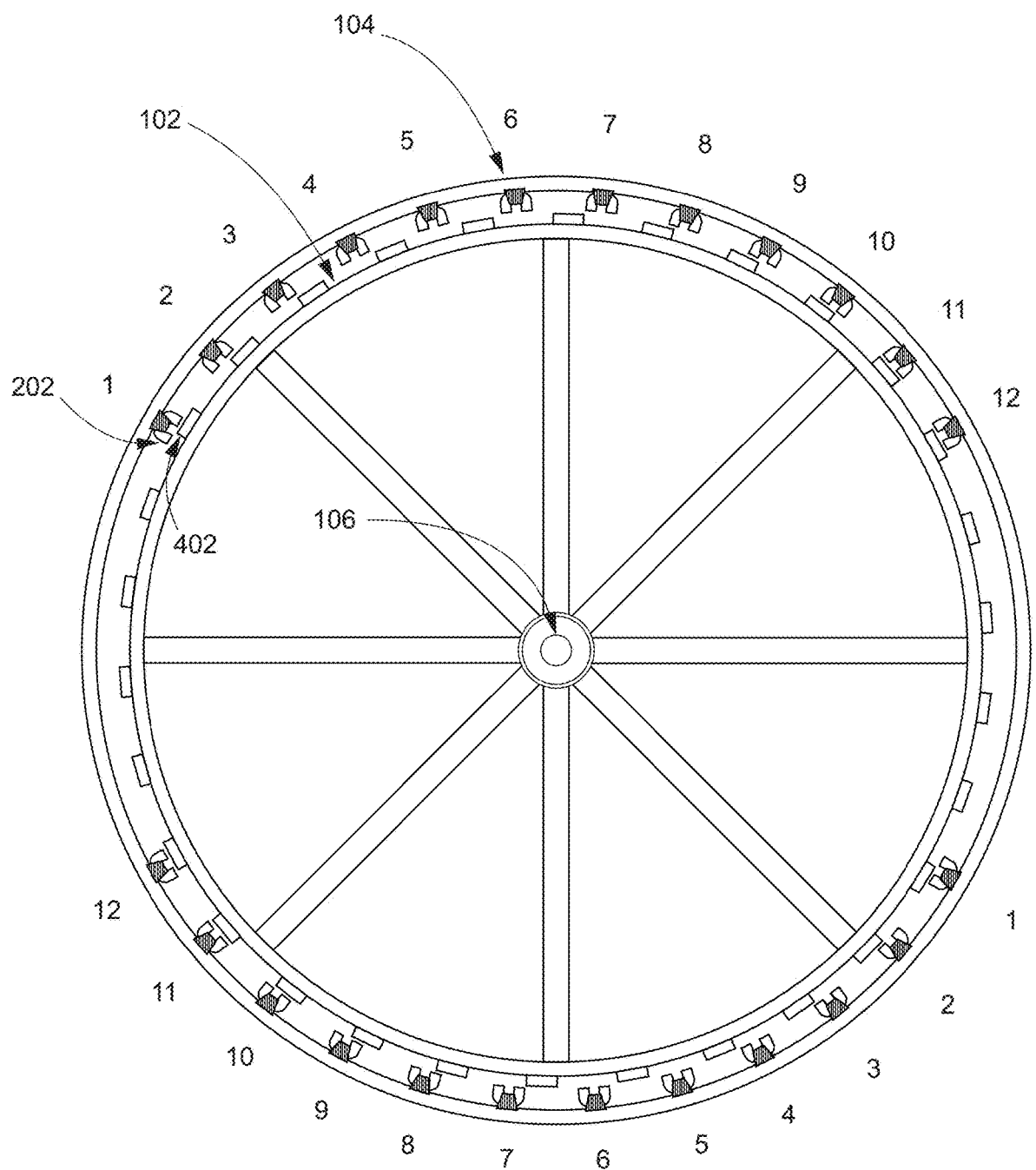
FIG. 7A illustrates a front view of a rotor assembly and a stator assembly used in a scalable low-speed high torque DC electric motor system in accordance with an embodiment of the invention.

FIG. 7A is a front view of a scalable low speed high torque electric motor segment in accordance with an embodiment of the invention. In an embodiment of the invention, a motor segment consists of a stator assembly 104 comprised of 24 stationary electromagnets 202, and a rotor assembly 102 comprised of 30 electrical steel laminations 402—each hereinafter referred to as a 'rotor lamination." Electromagnets are organized in sets of corresponding pairs. Each set is energized in order by set number (1-12) as numbered clockwise. The rotor assembly 102, with its 30 rotor laminations attached, is 8.6 feet in diameter and 4 inches in width. The rotor includes a shaft assembly 106 or axle shaft located at the center. The air gap between the outer pole face of each rotor lamination and the pole face of each stationary electromagnet is 0.075 inches. Persons having skill in the art will understand that such a motor segment can be either scaled up or scaled down depending on the particular application for such a motor.

Persons skilled in the art will appreciate that numerous DC power sources may be utilized to power the scalable low speed high torque electric motor. Numerous regulators and/or resistors may be utilized to provide the proper voltage and current to power such a system. Moreover, persons skilled in the art will appreciate that such a system may be governed by a plurality of computer-implemented systems.

In a preferred embodiment of the invention, two sets of twelve stationary electromagnets 202 are organized into corresponding pairs. The corresponding pairs are labeled 1 through 12 numbered clockwise on the upper and lower halves of the motor segment. The distance between the center point of each stationary electromagnet 202 is 11 degrees. The distance between the center point of each rotor lamination 402 is 12 degrees.

Energized simultaneously as a set, each of the two stationary electromagnets causes its respective rotor lamination to be "pulled" via magnetic attraction 1-degree counterclockwise. Set 1 is energized when the leading edge of each #1 rotor lamination 402 is positioned at Angle (deg) 2.25 of its respective #1 stationary electromagnet. Set 1 is de-energized when the leading edge of each #1 rotor lamination 402 is positioned at Angle (deg) 3.25 of its respective #1 stationary electromagnet. This 1-degree counterclockwise rotation aligns the leading edge of each #2 rotor lamination at Angle (deg) 2.25 of its respective #2 stationary electromagnet.

Figure 7B:
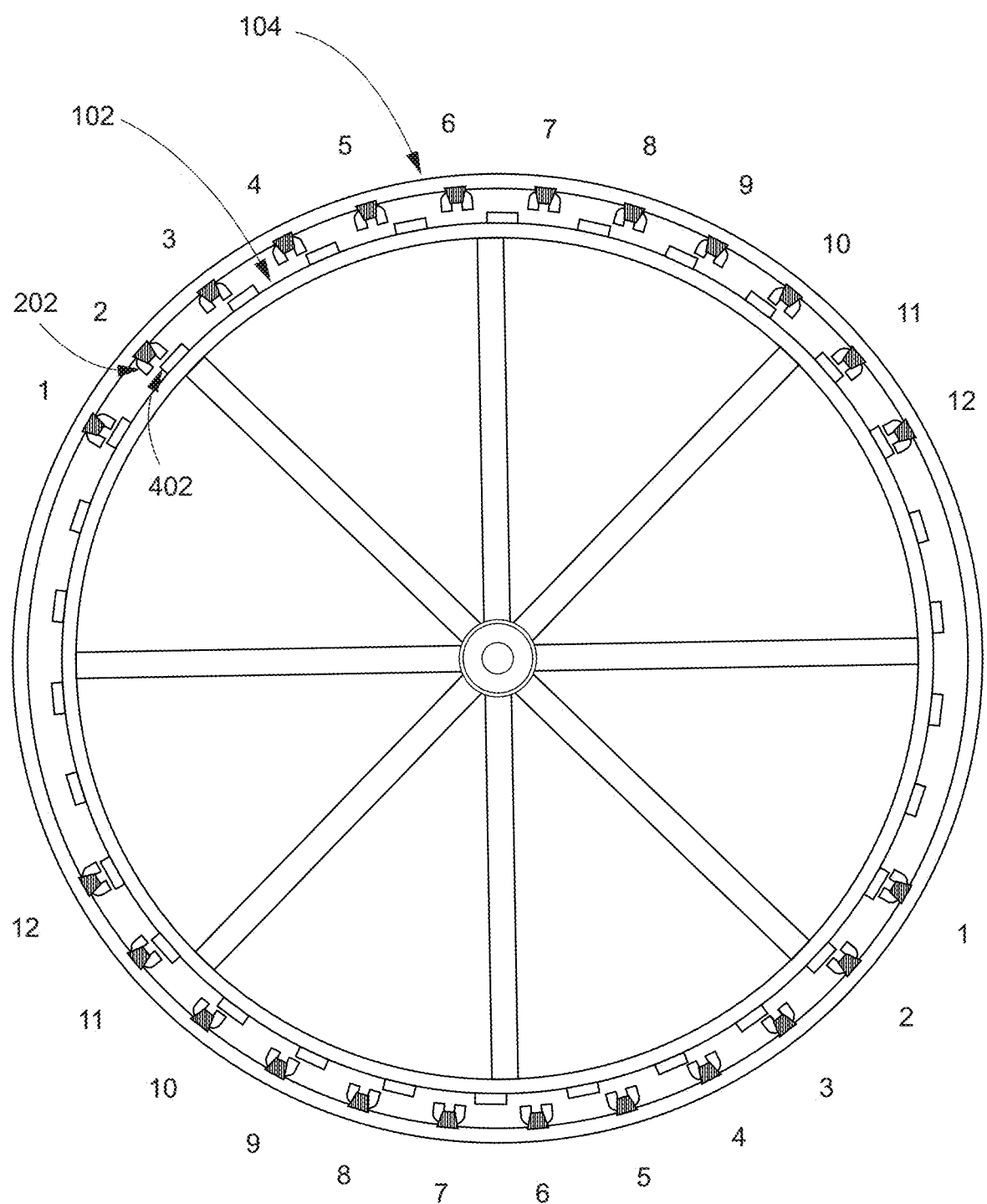
FIG. 7B illustrates a front view of a rotor assembly and a stator assembly used in a scalable low-speed high torque DC electric motor system in accordance with an embodiment of the invention.

FIG. 7B illustrates a front view of a scalable low speed high torque electric motor in accordance with an embodiment of the invention. In a preferred embodiment of the invention, two sets of twelve stationary electromagnets are organized into corresponding pairs. The corresponding pairs are labeled 1 through 12 numbered clockwise on the upper and lower halves of the motor segment. The angular distance between the center point of each stationary electromagnet 202 is 11 degrees. The angular distance between the center point of each rotor lamination 402 is 12 degrees. These angular distances, after a 1-degree counterclockwise rotation of the rotor assembly, allow the leading edge of the #2 rotor lamination, and in turn each succeeding rotor lamination, to be positioned at Angle (deg) 2.25 of its respective stationary electromagnet.

Set 2 is energized when the leading edge of each #2 rotor lamination 402 is positioned at Angle (deg) 2.25 of its respective #2 stationary electromagnet 202. Set 2 is de-energized when the leading edge of each #2 rotor lamination 402 is positioned at Angle (deg) 3.25 of its respective #2 stationary electromagnet 202. This 1-degree counterclockwise rotation aligns the leading edge of each #3 rotor lamination 402 at Angle (deg) 2.25 of its respective #3 stationary electromagnet 202.

The sequence continues as Set 3 is then energized when the leading edge of each #3 rotor lamination 402 is positioned at Angle (deg) 2.25 of its respective #3 stationary electromagnet 202. Set 3 is de-energized when the leading edge of each #3 rotor lamination 402 is positioned at Angle (deg) 3.25 of its respective #3 stationary electromagnet 102. This 1-degree counterclockwise rotation aligns the leading edge of each #4 rotor lamination 402 at Angle (deg) 2.25 of its respective #4 stationary electromagnet 202.

Sets 4 through 12 are energized and deenergized in order as described. The operational process, as described, will repeat at the conclusion of each 12-degrees of counterclockwise rotation, thereby causing continuous counterclockwise rotation.

Figure 8:
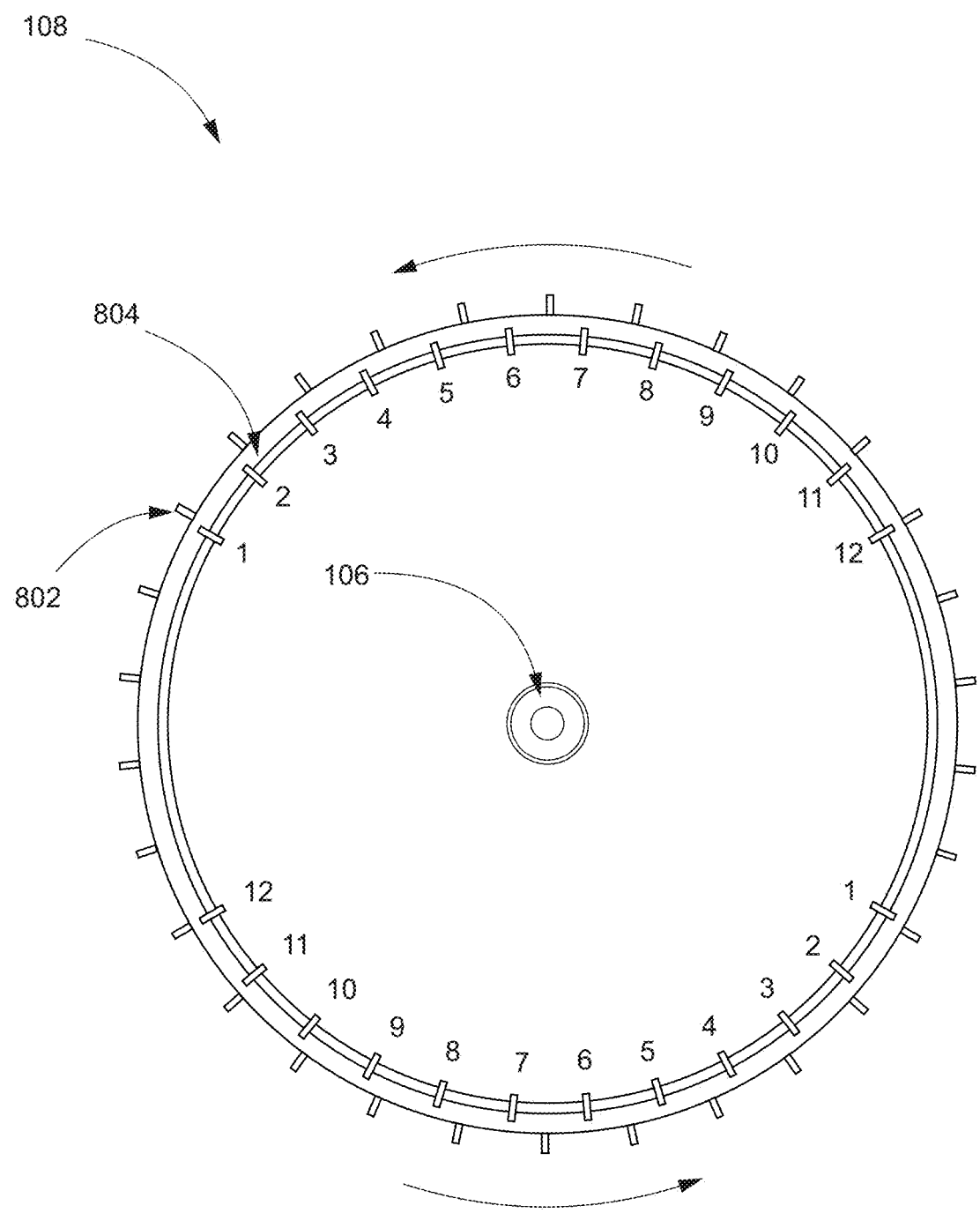
FIG. 8 illustrates a front view of a position sensor assembly of a scalable low-speed high torque DC electric motor system in accordance with an embodiment of the invention.

FIG. 8 illustrates a front view of a position sensor assembly 108 of a scalable low-speed high torque DC electric motor system in accordance with an embodiment of the invention. For purposes of the present patent application, a position sensor assembly is to be broadly defined as any combination of sensors which can be used to calculate the position of rotor laminations in relation to the electromagnets. Such sensors can operate on various principles, including changes in capacitance, electromagnetic induction, optical reflection, or Hall effect, to translate an object's position into an electrical signal which is sent to a computer system 600 for which the scalable low speed high torque DC electric motor, and the components thereof, may be embodied. In one embodiment of the invention, 30 position markers 802 are attached to a rotor wheel at specific locations. The position markers 802 are analogous to the rotor laminations on the rotor assembly. Two sets of 12 position sensors 804 are attached to a mounting bar at specific locations which represent fixed positions at the stator. The position sensors are numbered 1 through 12. The rotor wheel includes a shaft assembly 106 which serves the axis of rotation of the rotor wheel including 30 position markers. Each position sensor serves as an input/output device, and is positioned to provide a signal to the computer system 600 having at least one processor. The at least one processor of the computer system then energizes its respective set of stationary electromagnets at Angle (deg) 2.25 and de-energizes the stationary electromagnets at Angle (deg) 3.25. The 30 position markers allow the process to repeat when each position marker, in numerical order, rotates counterclockwise to the position held by marker number 1. Persons having skill in the art will readily appreciate that numerous other position sensor configurations using known position sensors and position markers can be utilized in order to provide information to the computer system to energize and de-energize each stationary electromagnet.

Figure 9:
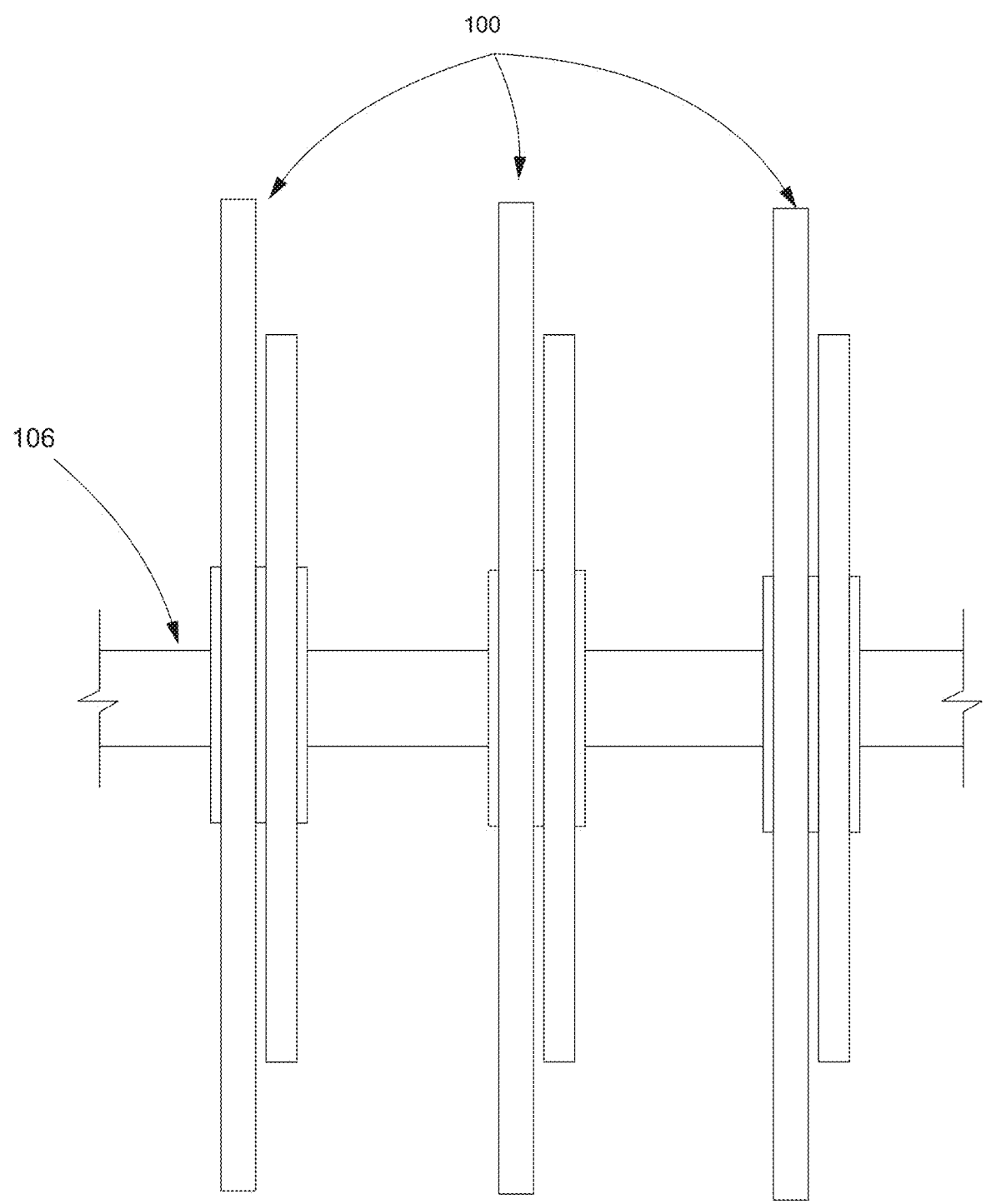
FIG. 9 illustrates a side view of three motor segments in a scalable low speed high torque DC electric motor system in accordance with an embodiment of the invention.

FIG. 9 illustrates a side view of three motor segments 100 in a scalable low speed high torque DC electric motor system in accordance with an embodiment of the invention. The scalable low-speed high torque DC electric motor system, subject to physical limitations, can be fitted with a shaft at the shaft assembly 106 that accommodates one, two, three, four, or any number of motor segments 100. The distance between each motor segment 100 must be sufficient to prevent magnetic interaction between motor segments.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the scalable low speed high torque electric motor, other equivalent or alternative methods of implementing the scalable low speed high torque electric motor according to the present invention will be apparent to those skilled in the art. Various aspects of the invention have been described above by way of illustration, and the specific embodiments disclosed are not intended to limit the invention to the particular forms disclosed. The particular implementation of the scalable low speed high torque electric motor may vary depending upon the particular context or application. By way of example, and not limitation, the scalable low speed high torque electric motor described in the foregoing was principally directed to larger scale electric motors and machines powered by such motors. However, similar techniques may instead be applied to other electric motors which implementations of the present invention are contemplated as within the scope of the present invention. Furthermore, implementations of the invention may extend to electro-mechanical devices which may integrate into the scalable low speed high torque electric motor. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the scalable low speed high torque electric motor are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A scalable low-speed high torque DC electric motor system comprising one or more motor segments, each motor segment comprising:
   a. a rotor assembly comprising a rotor and thirty rotor laminations spaced apart at twelve-degree increments on center;
   b. a stator assembly comprising a circular housing having twelve corresponding pairs of electromagnets with twelve electromagnets mounted to the upper end of the said circular housing and twelve corresponding electromagnets mounted to the lower end of the said circular housing; and c. a shaft assembly.

2. The scalable low-speed high torque DC electric motor system of claim 1 wherein the shaft assembly is capable of accommodating more than one motor segment.

3. The scalable low-speed high torque DC electric motor system of claim 1 wherein the thirty rotor laminations are of the same general size and shape.

4. The scalable low-speed high torque DC electric motor system of claim 1 wherein the twelve electromagnets mounted to the upper end of the said circular housing are of the same general size and shape and are spaced apart at eleven-degree intervals on center; and the twelve electromagnets mounted to the lower end of the said circular housing are of the same general size and shape and are spaced apart at eleven-degree intervals on center.

5. The scalable low-speed high torque DC electric motor system of claim 1 wherein the rotor is 8.6 feet in diameter.

6. The scalable low-speed high torque electric motor system of claim 1 wherein the air gap between the outer pole face of each rotor lamination and the pole face of each electromagnet is 0.075 inches.

7. The scalable low-speed high torque DC electric motor system of claim 1 further comprising one or more position sensors.

8. The scalable low-speed high torque DC electric motor system of claim 1 further comprising a computer system including at least one processor and memory having computer readable instructions which, when instructed by the said at least one processor, cause the scalable low-speed high torque DC electric motor system to:
   a. energize each corresponding pair of electromagnets to rotate the rotor assembly at least one degree;
   b. receive a signal from one or more position sensors after the rotor assembly has rotated a certain angular distance; and
   c. energize the next corresponding pair of electromagnets to rotate the rotor assembly at least one degree until a desired rotational speed has been achieved.

9. The scalable low-speed high torque DC electric motor system of claim 1 wherein the shaft assembly is capable of accommodating more than one motor segment.

10. The scalable low-speed high torque DC electric motor system of claim 1 wherein the one or more motor segments can be scaled up or scaled down depending on the particular application of the said scalable low-speed high torque DC electric motor system.

11. A scalable low-speed high torque DC electric motor system comprising one or more motor segments, each motor segment comprising:
   a. a rotor assembly comprising a rotor and thirty rotor laminations spaced apart at twelve-degree increments on center; and
   b. a stator assembly comprising a circular housing with twelve corresponding pairs of electromagnets, twelve electromagnets mounted to the upper end of the said circular housing and twelve electromagnets mounted to the lower end of the said circular housing;
   c. a shaft assembly;
   d. one or more position sensors; and
   e. a computer system having at least one processor.

12. The scalable low-speed high torque motor system of claim 11 wherein the rotor is 8.6 feet in diameter.

13. The scalable low-speed high torque electric motor system of claim 11 wherein the air gap between the outer pole face of each rotor lamination and the pole face of each electromagnet is 0.075 inches.

14. The scalable low-speed high torque electric motor system of claim 11 wherein the twelve electromagnets mounted to the upper end of the said circular housing are of the same general size and shape and are spaced apart at eleven-degree intervals on center; and the twelve electromagnets mounted to the lower end of the said circular housing are of the same general size and shape and are spaced apart at eleven-degree intervals on center.

15. The scalable low-speed high torque DC electric motor system of claim 11 further comprising a computer system including at least one processor and memory having computer-readable instructions which, when instructed by the at least one processor, cause the scalable low-speed high torque DC electric motor system to:
   a. energize each corresponding pair of electromagnets to rotate the rotor assembly at least one degree;
   b. receive a signal from the one or more position sensors after the rotor assembly has rotated a certain angular distance; and
   c. energize the next corresponding pair of electromagnets to rotate the rotor assembly at least one degree until a desired rotational speed has been achieved.

16. The scalable low-speed high torque DC electric motor system of claim 11 wherein the one or more motor segments can be scaled up or scaled down depending on the particular application of the said scalable low-speed high torque DC electric motor system.

* * * * *